Aug. 12, 1924. 1,504,884
D. GARST
FISHING FLOAT
Filed May 27, 1922

Inventor,
Dudley Garst, by
G.C. Kennedy,
Attorney.

Patented Aug. 12, 1924.

1,504,884

UNITED STATES PATENT OFFICE.

DUDLEY GARST, OF WATERLOO, IOWA.

FISHING FLOAT.

Application filed May 27, 1922. Serial No. 564,173.

*To all whom it may concern:*

Be it known that I, DUDLEY GARST, a citizen of the United States of America, and a resident of Waterloo, Blackhawk County, Iowa, have invented certain new and useful Improvements in Fishing Floats, of which the following is a specification.

My invention relates to improvements in fishing floats, and the object of my improvement is to provide for elongated elastic buoyant floats having splits extending from one side longitudinally to or beyond the longitudinal axis thereof to receive a fishing line, means for compressibly and adjustingly holding the split apart parts of the floats together to prevent escape of the line therefrom and to hold the line frictionally against displacement by ordinary forces.

Figure 2:
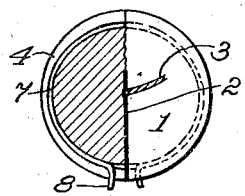

This object I have achieved by the means which are hereinafter described and claimed, and which are illustrated in the accompanying drawings, in which Figs. 1, 3, 5, and 7 are elevations of slightly different shaped elongated floats provided with different modifications of my improved holding means; Fig. 2 is a view, partially in plan and partially in horizontal section of said Fig. 1, and Figs. 4, 6, and 8 are respectively horizontal sections taken through the upper annular grooves of the floats shown in said Figs. 3, 5, and 7.

In said drawings, similar numerals of reference denote similar structures throughout the several views.

While my improved holding and fastening means may be applied in any desired way to floats of many different shapes or any shape, I have preferred to display them in the above drawings as used on floats of spindle or elongated shapes, coned downwardly frustally with the larger end in each case at the top, the tops being rounded.

For the purpose of inserting the fishing line 3 and holding it frictionally, each float 1 has a longitudinal split 2 extending inwardly from one side to or beyond the longitudinal axis of the float, but I prefer to extend the split beyond this axis when the float is made of cork or similar elastic compressible material, as the unsplit part of the float in the plane of said split 2 is thus made more hinge-like, while leaving less solid material in said plane to gradually imbibe water and swell which would impair the resilience of the float and tend to spread apart the split portions with more force.

An elongated float is much more responsive to slight pulls upon the line, it rests normally vertically in the water with its larger end up, and the smaller conically diminished part below has less resistance to the water.

The line 3 is inserted in the split 2 to be positioned in the longitudinal axis of the float where it is gripped frictionally by the compressible elastic walls of the split to hold it as against pulling lengthwise by small forces, although the line may be pulled through the split by the exercise upon it of sufficient force, in order to adjust the position of the float thereon, or to remove the line. However, I have provided certain novel means for keeping these split parts of the float in contact under compression, these means being designed and operative in such a way, that the line 3 may be readily removed from the float by shifting it sidewise through the split, so that it becomes unnecessary to remove sinkers or hooks from the line or detaching the line from a pole. The line is thus held in the split 2 without possibility of wear or injury such as might be occasioned if it were secured to the float by a metal clamp or fastener.

It has heretofore been difficult to prevent the split apart portions of a cork float from spreading when the cork has been immersed long enough to have become swelled. I prevent this inconvenience in the following manner.

The conical float 1 has near its upper and lower ends the annular grooves 4 and 5 respectively crossing the split 2. In these grooves are seated the split-rings 7 and 6 respectively, the split-ring 7 preferably having its extremities at its split bent angularly outwardly at 8 beyond the exterior periphery of the float, and as this ring is made from elastic metal, the ring may be partially rotated in the groove 4 by pressure of a finger on the hither extremity 8 which has the effect of slightly spreading the ring while letting it move easier, the ring then reacting to compress the separated parts of the float upon the line 3 frictionally, the ring crossing the split 2 and preventing escape sidewise of the line. The other split-ring 6 needs no angular extremities as it remains permanently positioned in said groove 6 with its split coincident with the split 2, for the ring 6 is stiff enough to hold the separated parts of the float tightly together, yet permits the removal of the line sidewise through these splits when desired by the exercise of a sufficient force.

Figure 4:
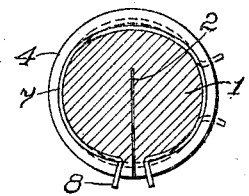
Figure 3:
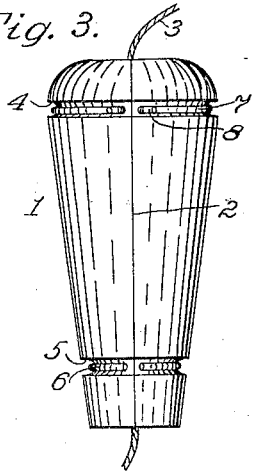

In Figs. 3 and 4, the upper groove 4 instead of being of annular contour is elliptic, having its major diameter at an angle to the plane of the split 2. With this contour, the split-ring 7 at the position where its split coincides with the split 2 is under less tension than when it has been turned about the float partially to bring its split out of line with the split 2, for the ring becomes spread in thus being turned and is put under greater tension, so in reaction it correspondingly compresses the parts separated by the split 2 to hold the line 3 more firmly.

Figure 6:
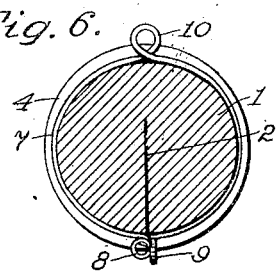
Figure 1:
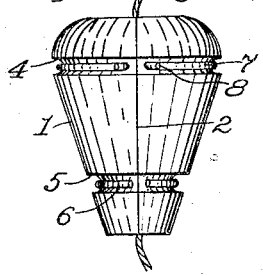
Figure 5:
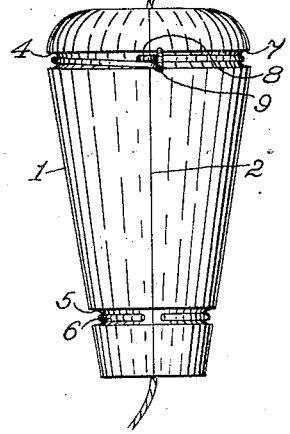

In Figs. 5 and 6 the ring 7 has its outturned extremities shaped into small rings 8 and 9, and the ring is made of sufficient length so that after insertion of the line 3 its said extremities may be overlapped so as to engage the rings 8 and 9 together, they being relatively positioned in different planes or at right angles relative to each other for interlocking. The part of the ring 7 opposite its split may have a twist to provide an eye 10, and a small tool may be inserted in this eye to further twist it about when it is necessary to contract the length or to increase it in the interlocking of its ends or otherwise.

Figure 8:
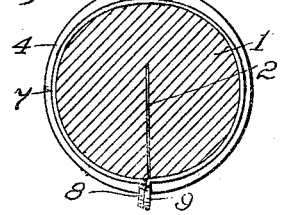
Figure 7:
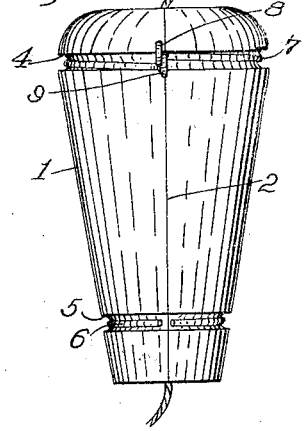

The split-ring of Figs. 7 and 8 is similar to the ring 7 of Fig. 5, but has the terminal rings 8 and 9 in parallel planes, which engage each other by overlapping in a similar manner.

Having described my invention, what I claim as new, and desire to secure by Letters Patent, is:

1. A fishing float, comprising an elongated elastic buoyant warpable body having a groove around it, said groove being of uncircular contour with its larger transverse dimension positioned at an angle to a split provided longitudinally in said body, and a split-ring mounted in said groove and shaped to be spread apart when the ring is rotated to place its split out of line with the split in said body.

2. A fishing float, comprising an elongated elastic semi-split body whose split extends longitudinally to the axis of the body, a fishing-line traversing said split along its inner limit and held by elastic reaction of the walls of the split, said body consisting of water warpable material and having annular grooves around its opposite ends, and split-rings constructed of resilient material seated around said body compressingly in said annular grooves, and one of them being uncircular and having terminal integral interlocking parts.

3. A fishing float, comprising an elongated body of elastic substance having a longitudinal split extending to its longitudinal axis, split-rings mounted around opposite end parts of said body to elastically compress the ends to prevent warping apart at said split, said body having an uncircular region to seat and to prevent escape of one of said split-rings.

Signed at Waterloo, Iowa, this 12th day of May, 1922.

DUDLEY GARST.